United States Patent [19]

Terao et al.

[11] 4,407,880
[45] Oct. 4, 1983

[54] SUBSTRATE OF MEMBER FOR RECORDING INFORMATION WITH LIGHT AND METHOD OF MANUFACTURING THE SAME

[75] Inventors: Motoyasu Terao, Hinodemachi; Shinkichi Horigome, Tachikawa; Kazuo Shigematsu, Kawasaki; Yoshinori Miyamura, Hinodemachi; Seiji Yonezawa, Hachioji, all of Japan

[73] Assignee: Hitachi, Ltd., Tokyo, Japan

[21] Appl. No.: 204,780

[22] Filed: Nov. 7, 1980

[30] Foreign Application Priority Data

Nov. 7, 1979 [JP] Japan .................. 54-153638[U]
Sep. 19, 1980 [JP] Japan .................. 55-129322

[51] Int. Cl.³ .................................. B32B 5/00
[52] U.S. Cl. .................... 428/156; 264/22; 264/106; 264/107; 264/255; 427/54.1; 428/65; 428/215; 428/415; 428/416; 428/426; 428/441; 428/442; 428/508; 428/532; 156/245

[58] Field of Search .................. 428/64, 65, 156, 161, 428/162, 212, 213, 215, 216, 426, 441, 442, 457, 458, 461–463, 414–416, 423–425, 508, 532; 264/22, 106, 107, 255; 427/54.1, 144, 146; 358/128.5, 129

[56] References Cited

U.S. PATENT DOCUMENTS

| | | | |
|---|---|---|---|
| 2,994,111 | 8/1961 | Koss et al. | 264/255 |
| 4,157,931 | 6/1979 | Bricot et al. | 264/106 |
| 4,188,433 | 2/1980 | Dijkstra et al. | 428/64 |

Primary Examiner—Bruce H. Hess
Attorney, Agent, or Firm—Antonelli, Terry & Wands

[57] ABSTRACT

A substrate of a recording member comprising a hard base, a first organic substance layer which is formed on the base, and a second organic substance layer which is made of a solvent-soluble organic substance and which is formed on a surface of the first organic substance layer opposite to a surface thereof lying in contact with the base. This substrate can be reused.

15 Claims, 6 Drawing Figures 4,407,880

SUBSTRATE OF MEMBER FOR RECORDING INFORMATION WITH LIGHT AND METHOD OF MANUFACTURING THE SAME

BACKGROUND OF THE INVENTION

This invention relates to the substrate of a member for recording information and a method of manufacturing the same. More particularly, it relates to the substrate of an information recording member employing a hard base of a material such as chemically reinforced glass, hard organic polymer and metal, and also to a method of manufacturing the same.

It is known from, for example, Japanese Published Unexamined Patent Application No. 55-4793 (corresponding to UK patent application GB 2,021,798) that the replica of groove-shaped and pit-shaped recesses for a servo track etc. is formed by the use of a light-curable resin such as ultraviolet-curing resin in the substrate of an information recording member for recording information with light. According to this method, an ultraviolet-curable resin layer is disposed on the surface of a mold, a base is arranged on the lacquer layer, ultraviolet rays are projected through the base or the mold thereby to cure the resin layer, the assembly which consists of the base and the resin layer cured to bond with the base is removed from the mold, and an information recording layer is thus formed on the resin layer side of the assembly. Regarding this method, however, facts as described below have been revealed. Since the ultraviolet-curing resin is hard to dissolve in an organic solvent after curing, it is difficult to remove the ultraviolet-curing resin which remains stuck on the mold, without having been removed with the base, at the removal of the assembly from the mold after the curing. Even when the amount of the resin which is left by one operation of forming the replica is slight, the resin accumulates when the mold is utilized for a plurality of operations of forming replicas, and errors in the case of reproducing the information increase. In addition, the stability of preservation for a long term is required of a recording film, which is therefore made of a material difficult to dissolve in acids, alkalies, water, organic solvents etc. Since both the substrate surface and the recording film are hard to dissolve in this manner, it is extremely difficult to dissolve the recording films of the recording members rejected in an inspection or the recording members used for reuse of the base.

SUMMARY OF THE INVENTION

An object of this invention is to provide the substrate of a recording member which is stable and long in lifetime and which can lower the error rate and permit reuse.

This and other objects are accomplished by a substrate of a recording member comprising a hard base, a first organic substance layer which is formed on said base, and a second organic substance layer which is made of a solvent-soluble organic substance and which is formed on a surface of said first organic substance layer opposite to a surface thereof lying in contact with said base.

DETAILED DESCRIPTION OF THE PREFERRED EMBODIMENTS

Figure 1A:
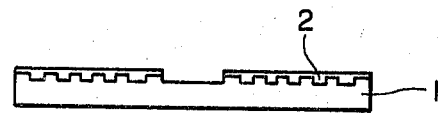
FIGS. 1a, 1b, 1c and 1d are views for explaining the manufacture of the substrate of a recording member according to this invention.

The substrate of a recording member according to this invention is manufactured in such a way that a second organic substance layer is formed on a mold (made of, for example, nickel or a nickel alloy) having recesses for a servo track etc. by, for example, applying a solution of a material to form the second organic substance layer onto the mold directly or through a mold releasing agent and then drying the solution, that a material to form a first organic substance layer is arranged on the second organic substance layer, that a base is pressed against the material for the first organic substance layer, and that the base provided with the first and second organic substance layers is stripped off from the mold after the first organic substance layer has been cured.

Therefore, the material of the first organic substance layer is one which is curable from its liquid state and which has a bonding property. Preferable as such materials are ultraviolet-curing resins, epoxy type adhesives, etc. Among all, the ultraviolet-curing resins are the most preferable in simplifying the manufacturing process. In any of the materials, one of the solventless type is favorable. When the ultraviolet-curing resin is used, at least one of the mold and the base needs to be substantially transparent.

As the ultraviolet-curing resins, there are employed known ones of the acryl type, the epoxy type, the urethane type, the polyene-polythiol type, etc.

Further, epoxy resins etc. are employed.

Used as the base is glass, chemically reinforced glass, an organic polymer such as acrylic resin, methacrylic resin, acrylonitrile-styrene copolymer and polyethylene terephthalate, or a metal such as aluminum, aluminum alloy, stainless steel, titanium and titanium alloy.

As the solvent-soluble organic substances preferable for forming the second organic substance layer, there are mentioned a cellulose type resin such as cellulose acetate, polyvinyl alcohol, polyvinyl butyral, polyvinyl formal, polyethylene glycol, polyvinyl chloride, polyvinyl acetate, polyvinylidene chloride, polyvinylidene fluoride, polystyrene, polypropylene, polybutadiene, polyacetal, polyacrylonitrile, polybutene, an acrylic resin such as polymethymethacrylate, polyimide, polyamide, polyacrylamide, polyvinyl pyrrolidone, polyparaxylene, polyvinyl cinnamate, polycarbonate, polyethylene terephthalate, nitrocellulose, a phenolic resin, a maleic acid resin, an alkylphenolic resin, a keton resin, silicone, a urea resin, a phenol-formaldehyde resin, a furan resin, a coumarone resin, an epoxy, an alkyd resin, and a carbonic acid ester; or the copolymer, ester polymer and derivative of the aforecited substances; or an organic carboxylic acid such as higher fatty acid, aromatic carboxylic acid and polycarboxylic acid, or the salt or ester thereof; or fatty acid amid, bisfatty acid amid, fatty acid imid, gelatine, chitin, hemicellulose, pectin, vegetable gum, paraffin, wax, shellac, rosin, and natural or synthetic rubber; etc. Among these organic substances, ones with which the formed films are soluble in solvents are favorable.

These organic substances can be employed by mixing two or more sorts thereof. A dye may well be mixed in the organic substances in order to reduce reflection in the second organic substance layer and increase the absorption of light when the member for recording information has been prepared.

The organic substances should favorably dissolve in at least one of solvents to be mentioned below in a period of time of at most approximately 1 hour after they have formed the film.

Especially preferable among the aforecited organic substances are the cellulose type resin, gum type resin, vinyl type resin, carbonic acid ester, rosin-denatured maleic acid resin, alkylphenolic resin, and keton resin.

As a method of forming a layer of the organic substance or substances, a method in which the organic substance or substances is/are dissolved in the solvent and then applied (the use of a spinner is recommended) is the most preferable, but any other known method may well be employed.

As the solvents, there are used an aliphatic hydrocarbon such as hexane, heptane, petroleum benzine and cyclohexane; an aromatic hydrocarbon such as benzene, toluene, xylene and ethylbenzene; a hydrocarbon halogenide such as methylene chloride, carbon tetrachloride and trichloroethane; an alcohol such as methanol, ethanol and n-propanol; an ether such as ethyl ether and tetrahydrofuran; a ketone such as methyl ethyl ketone, methyl isobutyl ketone and cyclohexanone; an ester such as methyl formate, ethyl acetate and n-propyl acetate; a polyhydric alcohol derivative such as ethylene glycol monoethyl ether; a fatty acid or phenol of acetic acid; and further, a compound containing nitrogen or sulfur, or water. These are used alone in some cases, and are used as a mixed solvent consisting of two or more sorts thereof in other cases.

The first organic substance layer is difficult to be dissolved by the solvent or solvents which dissolves/-dissolve the second organic substance layer made of the solvent-soluble organic substance. Therefore, in case where the reuse of a rejected product etc. is necessary, the first organic substance layer is made thin, and after dissolving the second organic substance layer the concave and convex replica is formed again on the remaining first organic substance layer by the same method by utilizing the structure with the first organic substance layer stuck on the surface of the base as a new base. In this case, accordingly, the thickness of the first organic substance layer is preferably at least 0.1 $\mu$m and at most 50 $\mu$m. When the reuse need not be considered, the thickness may be at least 0.1 $\mu$m and at most 500 $\mu$m.

The thickness of the second organic substance layer needs to be, at least, a thickness enough to bury the concavities or recesses of the mold. Further, it is favorable that the thickness is still greater, in other words, that the second organic substance layer exists even on the convexities or protuberances of the mold. In this case, it is preferable that the thickness of the second organic substance layer as taken from the top of the protuberance of the mold to the interface between this second organic substance layer and the first organic substance layer (to the substantially middle level of a mixed region including the first and second organic substances when the boundary is not clear), in other words, the thickness of a concavity in the second organic substance layer itself ranges from at least 0.05 $\mu$m to at most 10 $\mu$m. A range of from at least 0.1 $\mu$m to at most 0.8 $\mu$m is particularly preferable.

Regarding the thickness of the base, a value of at least 50 $\mu$m and at most 20 mm is preferable, and a value of at least 100 $\mu$m and at most 2 mm is particularly preferable.

As a recording film which is formed on the substrate of this invention, there can be employed any of almost all known recording films, for example, films whose principal constituents are a metal such as Rh, a semi-metal such as Bi, a semiconductor such as Te, and an organic substance such as paraffin. An intermediate layer such as light absorbing layer may well be disposed between the recording film and the substrate described above. As regards the mechanism of recording into the recording film, it is possible to apply any of almost all known mechanisms which include the formation of pits by vaporization and deformation; the inversion of magnetization by a phase change, by heating or by heating and application of a magnetic field; the reaction or mutual diffusion between two layers; etc.

Hereunder, this invention will be described in detail in conjunction with examples.

EXAMPLE 1

FIGS. 1a to 1f are schematic views of the manufacturing steps of a substrate for an optical disk as an embodiment of this invention. All the figures are sectional views of the substrate. The substrate exemplifies one which is circular and in which a hole to pass a rotary shaft therethrough exists in the central part thereof.

A disk of chemically reinforced glass produced by the ion exchange process as had a thickness of 1.1 mm, an outside diameter of 300 mm and an inside diameter of 35 mm and as was processed with a silane coupling agent was prepared as a base, a solution in which cellulose acetate was dissolved in cyclohexanone was prepared as a solution for forming a second organic substance layer soluble in a solvent, and an acryl type ultraviolet-curing resin was prepared as an ultraviolet-curing resin.

Figure 1B:
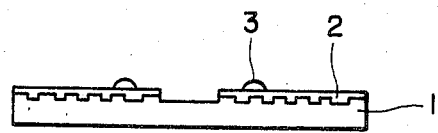
Figure 1C:
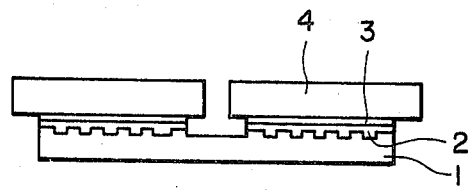
Figure 1D:
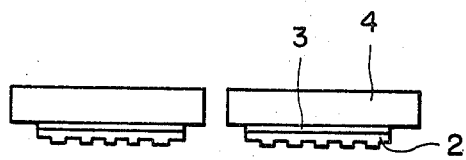

As illustrated in FIG. 1a, while rotating a mold 1 which had a groove-shaped recess being a servo track (tracking guide) and elliptical recesses or protuberances formed in parts of the track and representing track and sector addresses etc., silicone oil as a mold releasing agent was first evaporated and the cellulose acetate solution was subsequently applied. The solution had the solvent vaporized and was dried into the solvent-soluble second organic substance layer 2. At the next step, the ultraviolet-curing resin 3 was dropped onto the layer 2 into the shape of a circle as shown in FIG. 1b. As illustrated in FIG. 1c, the disk of the chemically reinforced glass 4 was pressed from above, first in its inner peripheral part and then slowly up to its outer peripheral part so as to stretch out the ultraviolet-curing resin. Thereafter, the resin was cured in about 5 seconds by irradiating it with ultraviolet rays through the chemically reinforced glass. Subsequently, the outer peripheral part of the disk of the chemically reinforced glass was pushed up to strip off the finished substrate from the mold. Then, the structure down to the cellulose acetate layer was released from the mold as shown in FIG. 1d.

Figure 1E:
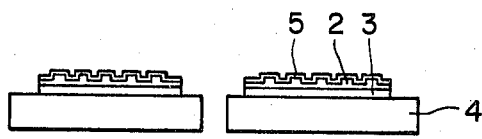
FIGS. 1e and 1f are sectional views for explaining the recording member which employs the substrate of this invention.

At the next step, the substrate was put into a vacuum evaporation equipment, and an $As_{20}Te_{60}Se_{20}$ recording layer 5 was evaporated on the cellulose acetate layer 2 to a thickness of approximately 40 nm as shown in FIG. 1e.

Figure 1F:
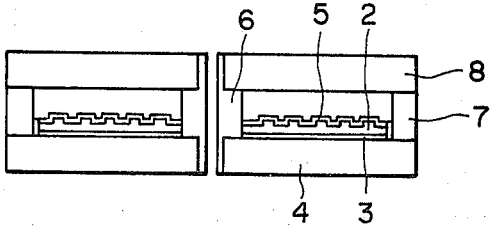

Subsequently, as shown in FIG. 1f, spacers 6 and 7 which were 0.5 mm thick were respectively stuck to the inner periphery and outer periphery of the disk on the side on which the evaporated film was disposed, and a protective disk of chemically reinforced glass 8 whose thickness, outside diameter and inside diameter were the same as those of the disk 4 was stuck to the spacers 6 and 7. In bonding the spacers and the disks of chemically reinforced glass, it is especially favorable to use an epoxy adhesive or an ultraviolet-curing adhesive.

A laser beam for recording or readout was caused to enter from the side of the chemically reinforced glass 4 being the transparent base. The recording was carried out in such a way that, while tracking the servo track by optically detecting it, pits based on vaporization and deformation were formed in the $As_{20}Te_{60}Se_{20}$ recording film. It is also possible to cause the recording beam or the readout beam to enter from the side of the protective chemically-reinforced glass 8. In the present example, an error rate of about $5 \times 10^{-5}$ was obtained. The protective chemically-reinforced glass may well be replaced with a substrate provided with the same recording film as described above.

In comparison with the case of forming the concave and convex replica by employing only the ultraviolet-curing resin, the formation of the replica by the use of cellulose acetate is also effective to prevent the variation of the recording film versus time. More specifically, in case where the relative humidity of that space of a disk in which a recording film was airtightly enclosed became 92%, the recording film having a composition of $Te_{90}Se_{10}$ and a thickness of approximately 40 nm as evaporated directly on the ultraviolet-curing resin had its initial transmission factor of 10% raised to 25% to degrade its recording sensitivity in about 2 weeks, whereas the recording film having the same composition and thickness but formed on the cellulose acetate layer overlying the ultraviolet-curing resin exhibited no change in its transmission factor.

In case where the mold bears video, audio or digital information or the like information in the form of the concavities or convexities, the information can be directly read out with reflected light by evaporating such a metal as aluminum onto the concave and convex surface of the replica formed as described above. In this case, the structure itself can be used as an optical disk, not as a substrate.

Besides the disk of the chemically reinforced glass, a disk of an organic polymer such as acrylic resin can be similarly employed.

Similar results were obtained even when the layer of cellulose acetate was replaced with a layer of rosin-denatured maleic acid resin, alkylphenolic resin, cyclized polyisoprene, polyvinyl alcohol, polycarbonate of bisphenol A, cellulose acetate butyrate, or keton resin.

With the substrate of this invention, notwithstanding that the $As_{20}Te_{60}Se_{20}$ film is hard to dissolve in both acids and alkalies, it can also be removed by dissolving the cellulose acetate layer or the like in the organic solvent. Thus, even when the substrate was reused ten times, the change of the error rate was scarcely noted.

EXAMPLE 2

A disk of chemically reinforced glass produced by the ion exchange process as had a thickness of 1.1 mm, an outside diameter of 330 mm and an inside diameter of 70 mm was prepared as a base in advance, and a cellulose acetate sheet which was 0.05 mm thick was prepared as a material for forming a second organic substance layer.

A mold which bore a groove-shaped recess being a tracking guide was flushed with methyl acetate to be uniformly wetted, and had the cellulose acetate sheet stuck thereto. At this time, the cellulose acetate sheet dissolved by the methyl acetate formed the second organic substance layer. Subsequently, the cellulose acetate layer was coated with an epoxy adhesive and had the chemically-reinforced glass disk stuck thereto. When the mold was subsequently released from one end thereof, the cellulose acetate layer remained on the side of the chemically-reinforced glass disk and manifested a grooved surface. At the next step, the substrate thus formed was put into a vacuum evaporation equipment, and an As-Te-Se-based recording film was evaporated on the cellulose acetate layer to a thickness of approximately 40 nm. Thereafter, a part of the peripheral edge of the film was wiped away with acetone or the like. Subsequently, spacers which were 0.1 mm thick were respectively stuck to the inner periphery and outer periphery of the disk on the side on which the evaporated film was disposed, and a protective disk of chemically reinforced glass whose thickness, inside diameter and outside diameter were the same as those of the aforecited disk was stuck to the spacers. It is more favorable that also the protective chemically-reinforced glass disk has a sheet of organic substance stuck onto its surface on the opposite side of the recording film so as to reinforce the structure. It renders the bonding still stronger that the organic substance sheet or the cellulose acetate sheet is not disposed in the parts to be stuck with the spacers.

As described above in detail, according to this invention, at least two organic-substance layers are disposed on a hard base such as of chemically reinforced glass, whereby an excellent information recording member or substrate for an information recording member is provided. This is greatly advantageous in industry. In addition, the invention is not restricted to optical information recording member, but it is also applicable to the concave and convex surface corresponding to information, of a disk of a system in which, using a stylus to contact with the disk surface, the information are read out on the basis of mechanical oscillations or changes in the capacitance between an electrode overlying the stylus and the disk. Moreover, in case where a recording film is formed on the substrate of this invention, the recording density can be raised owing to the effect of suppressing the expansion of pits due to surface tensions during the formation of the pits, the surface tensions being attributed to concave and convex parts and to unequal thicknesses of the recording film in different level parts of the concave and convex parts.

We claim:

1. A method of manufacturing a substrate of a recording member, comprising the step of forming a second organic substance layer made of a solvent-soluble organic substance on a mold to provide a second organic substance layer whose first surface, adjacent the mold, follows the contour of the mold and whose surface opposite said first surface is substantially flat, said second organic substance layer having a thickness at its thinnest part of 0.05–10 μm, said second organic substance layer being formed by depositing a stratum of the solvent-soluble organic substance on a mold and drying said stratum, said second organic substance layer being formed directly on the mold, the step of forming a first organic substance layer on said second organic substance layer, said first organic substance layer being made of an ultraviolet-curing resin of a solventless type, and of a material which is curable from its liquid state and which has a bonding property, the step of arranging a hard base on said first organic substance layer, at least one of said mold and said base being substantially transparent, the step of curing said first organic substance layer to bond said base and said second organic substance layer, said curing being carried out by irradiating said first organic substance layer with ultraviolet rays through said mold or said base, and the step of releasing said base from said mold together with said first and second organic substance layers.

2. A method of manufacturing a substrate according to claim 1, wherein said first organic substance layer is formed to a thickness of from 0.1 $\mu$m to 500 $\mu$m.

3. A method of manufacturing a substrate according to any one of claims 1 or 2, wherein said first organic substance layer has a thickness of from 0.1 $\mu$m to 50 $\mu$m, whereby the substrate can be reused as a base member in forming a new substrate.

4. A method of manufacturing a substrate according to claim 1, wherein said solvent-soluble organic substance is at least one organic substance selected from the group consisting of a cellulose type resin, gum type resin, vinyl type resin, carbonic acid ester, rosin-denatured maleic acid resin, alkylphenolic resin and keton resin.

5. A method of manufacturing a substrate according to claim 4, wherein the material of the first organic substance layer is selected from the group consisting of acryl type ultraviolet-curing resins, epoxy type ultraviolet-curing resins, urethane type ultraviolet-curing resins and polyene-polythiol type ultraviolet-curing resins.

6. A method of manufacturing a substrate according to claim 1, wherein said mold has concavities or convexities, and wherein said first surface of said second organic substance layer has convexities or concavities, corresponding to the respective concavities or convexities of said mold, after release from said mold.

7. A method of manufacturing a substrate according to claim 1 or 6, wherein said mold surface on which the second organic substance layer is formed has a surface configuration with recesses constituting a servo track, whereby said substrate can be used as a substrate for an information recording member.

8. A method of manufacturing a substrate according to claim 7, wherein said mold surface on which the second organic substance layer is formed has elliptical recesses or protuberances formed in parts of the servo track to represent track and sector addresses for said substrate of a recording member.

9. A method of manufacturing a substrate according to claim 1, wherein said base is made of chemically reinforced glass.

10. A method of manufacturing a substrate according to claim 1, wherein said base is substantially transparent.

11. A method of manufacturing a substrate according to claim 1, wherein a thinnest part of said second organic substance layer has a thickness of from 0.1 $\mu$m to 0.8 $\mu$m.

12. A method of manufacturing a substrate according to claim 1, wherein the material of said hard base is selected from the group consisting of glass, chemically reinforced glass, acrylic resin, methacrylic resin, acrylonitrile-styrene copolymer, polyethylene terephthalate, aluminum, aluminum alloy, stainless steel, titanium and titanium alloy.

13. A method of manufacturing a substrate according to claim 12, wherein said hard base has a thickness of 50 $\mu$m to 20 mm.

14. Product formed by the process of claim 1.

15. A method of manufacturing a substrate according to claim 1, wherein said second organic substance layer is made of cellulose acetate.

* * * * *